(12) United States Patent
Chan et al.

(10) Patent No.: US 10,824,349 B1
(45) Date of Patent: Nov. 3, 2020

(54) SECURED INPUT/OUTPUT RESOURCE PROTECTION

(71) Applicants: ADVANCED MICRO DEVICES, INC., Santa Clara (CA); ATI TECHNOLOGIES ULC, Markham (CA)

(72) Inventors: Maggie Chan, Markham (CA); Philip Ng, Markham (CA); David Kaplan, Austin, TX (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 16/222,334

(22) Filed: Dec. 17, 2018

(51) Int. Cl.
G06F 3/06 (2006.01)
G06F 21/60 (2013.01)
G06F 9/455 (2018.01)
H04L 9/06 (2006.01)

(52) U.S. Cl.
CPC ............ *G06F 3/0622* (2013.01); *G06F 3/061* (2013.01); *G06F 3/0659* (2013.01); *G06F 3/0673* (2013.01); *G06F 21/602* (2013.01); *G06F 9/45558* (2013.01); *G06F 2009/45587* (2013.01); *H04L 9/0631* (2013.01)

(58) Field of Classification Search
CPC .... G06F 3/0622; G06F 3/0673; G06F 3/0659; G06F 3/061; G06F 21/602; G06F 9/45558; G06F 2009/45587; H04L 9/0631
See application file for complete search history.

(56) References Cited

U.S. PATENT DOCUMENTS

| | | | |
|---|---|---|---|
| 2008/0222338 A1* | 9/2008 | Balasubramanian | G06F 9/5061 710/306 |
| 2013/0145055 A1 | 6/2013 | Kegel et al. | |
| 2016/0350244 A1* | 12/2016 | Tsirkin | G06F 13/28 |
| 2019/0012195 A1* | 1/2019 | Hirose | G06F 9/44521 |
| 2019/0042461 A1* | 2/2019 | Vakharwala | G06F 9/3802 |
| 2019/0251275 A1* | 8/2019 | Ramrakhyani | G06F 3/0673 |

OTHER PUBLICATIONS

Kaplan, David, et al., "AMD Memory Encryption", AMD White Paper, Apr. 21, 2016, 12 pages.
"Resizable BAR Capability", PCI-SIG Engineering Change Notice, Apr. 24, 2008, 9 pages.
Website https://www.intel.com/content/www/us/en/programmable/documentation/lb11414013788823/nik1410564908426/nik1410905631577.html, "SR-IOV Virtualization Extended Capabilities Registers", accessed Dec. 17, 2018, 11 pages.
Website https://docs.microsoft.com/en-us/windows-hardware/drivers/network/sr-iov-physical-function--pf-, "SR-IOV Physical Function (PF)", Dec. 5, 2018, 1 page.
"AMD Memory Encryption Tutorial", International Symposium on Computer Architecture (ISCA), Jun. 19, 2016, 82 pages.

\* cited by examiner

Primary Examiner — Masud K Khan

(57) ABSTRACT

A processing system includes a plurality of input/output (I/O) devices representing a plurality of I/O resources. Each I/O resource has at least one corresponding memory mapped I/O (MMIO) address range. A trap handler detects a write request targeting a configuration space of an identified I/O resource of the plurality of I/O resources and, responsive to determining the identified I/O resource is a protected I/O resource, selectively blocks the write request from further processing by the processing system based on whether the write request would change an MMIO address decoding of the identified I/O resource.

21 Claims, 5 Drawing Sheets

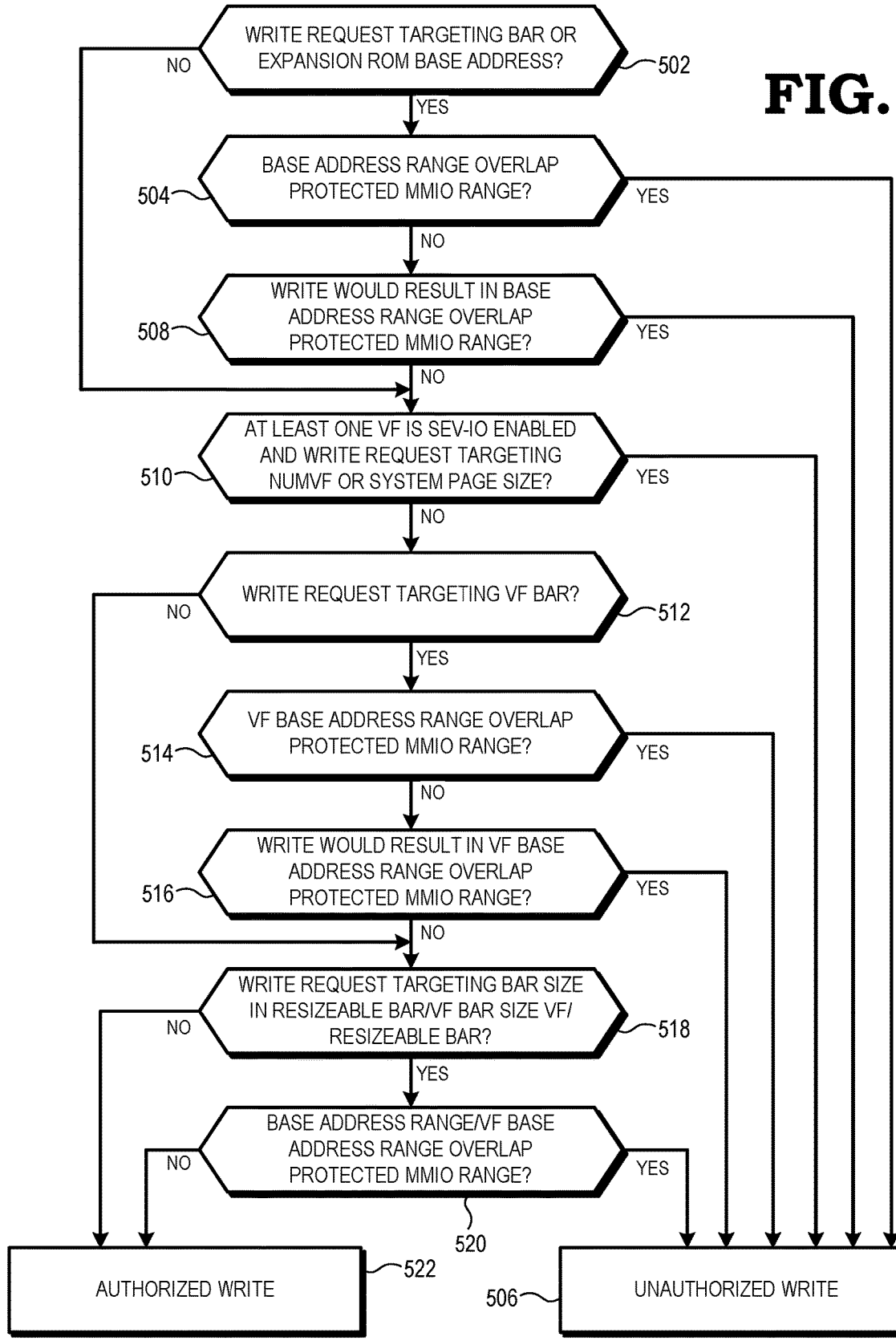

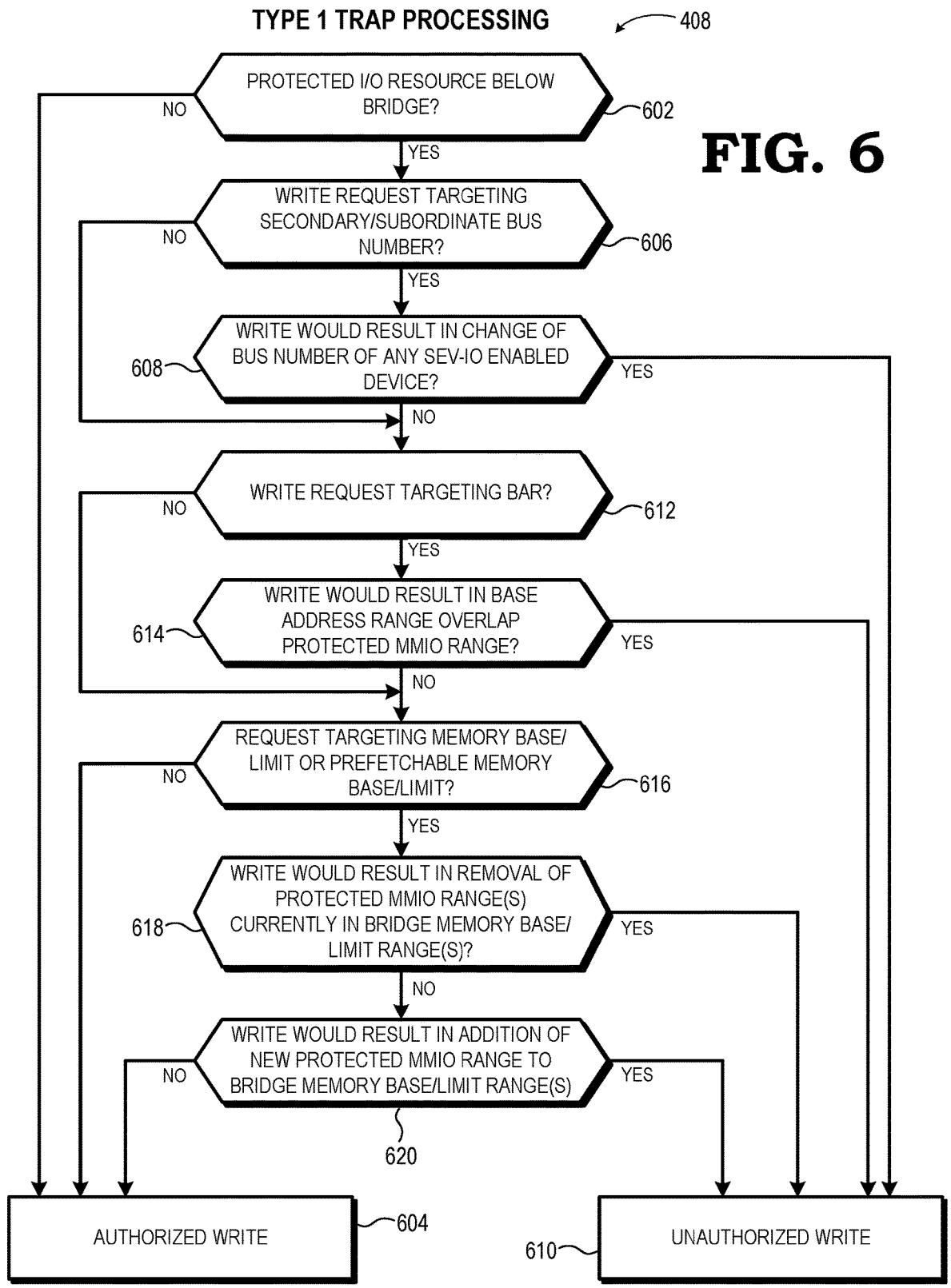

SECURED INPUT/OUTPUT RESOURCE PROTECTION

BACKGROUND

Peripheral Component Interconnect (PCI), PCI Express (PCIe) and similar peripheral connection protocols utilize memory mapped input/output (MMIO) in which data and commands are exchanged between one or more processors and one or more input/output (I/O) devices (also referred to as peripheral devices) via addressing that is mapped to a memory address space, such as the same memory address space representing a system memory. Input/output virtualization (IOV) techniques allow a single physical I/O resource to be shared among multiple virtual machines (VMs) in a virtualized environment by presenting the physical I/O resource as multiple virtual I/O resources. For example, for single-root IOV (SR-IOV) for PCIe and similar I/O virtualization specifications, each physical function of an I/O device may be duplicated, in whole or in part, as one or more virtual functions, with each virtual function having its own configuration space and MMIO address space(s) and being assignable to a corresponding VM.

Secured Encryption Virtualization (SEV) and similar protection-through-encryption technologies seek to provide security and separation in a virtualized environment by providing for the encryption of memory and I/O data within the address space associated with a corresponding VM. Each VM is associated with its own encryption key, and a memory protection table is maintained to help ensure that a VM has access to only its own associated memory ranges and MMIO address ranges using its own keys. However, the hypervisor managing the virtualized environment typically has the ability to write to the configuration spaces of the physical or virtualized I/O resources, and thus a malicious hypervisor may subvert the protections afforded by SEV-IO or other MMIO encryption protection schemes through unauthorized reconfiguration of the configuration space of a targeted I/O resource. To illustrate, a malicious hypervisor may spoof an encryption-protected I/O resource by assigning a different unprotected hypervisor-controlled I/O resource the same bus/device/function (BDF) as the encryption-protected I/O resource, and thus resulting in any I/O operations directed to that BDF to be conducted in an unprotected MMIO address space. As another example, a malicious hypervisor may adjust the configuration space of a protected I/O resource so that its MMIO address space falls outside of the MMIO address spaces identified as being protected, and thus any I/O transactions with the targeted I/O resource, including direct memory access (DMA) operations into the memory address space of the associated VM, may be accessed in cleartext by the VM.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIG. 5 is a flow diagram illustrating a trap filter process for a configuration space write request directed to a device-type resource.

FIG. 6 is a flow diagram illustrating a trap filter method for a configuration space write request directed to a bridge-type resource.

DETAILED DESCRIPTION

Figure 1:
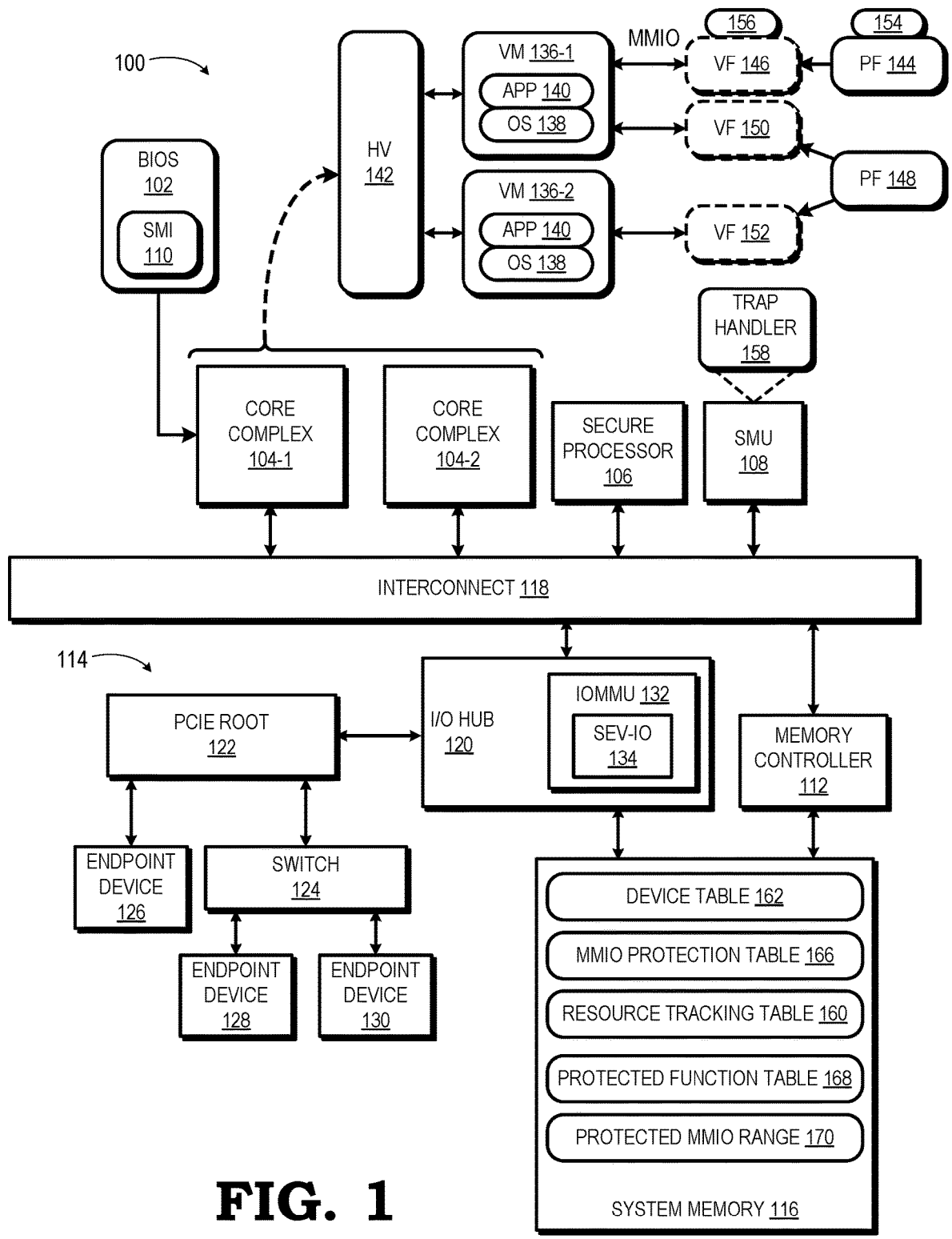
FIG. 1 is a block diagram of a processing system employing secured I/O resource protection in accordance with some embodiments.

A processing system employs single root input-output virtualization (SR-IOV) or other I/O virtualization approach to allow a single I/O device physical function (PF) to be shared by one or more VMs by instantiating one or more virtual functions (VFs) representative of the PF and facilitating the assignment of a VF to a corresponding VM. The processing system further employs SEV or another MMIO-encryption technique to protect the MMIO of some or all of the I/O resources, physical or virtual. The processing system employs an MMIO protection table or other one or more data structures to identify MMIO address ranges that are identified as protected MMIO address ranges, as well as the VM(s) and I/O resources associated with, and authorized to access, the corresponding protected MMIO address ranges.

A system management unit (SMU), system management interrupt (SMI) component, or other management component of the processing system employs a trap handler to trap write requests which intend to modify the configuration space of an I/O resource (such a write request referred to herein as a "configuration space write request"). The trap handler employs a trap filter that determines whether the configuration space write request will modify the MMIO address decoding associated with an I/O resource that is identified as a protected I/O resource if allowed to complete. This may include, for example, changing the base address register (BAR) of an I/O resource so that the original base address range no longer overlaps a protected MMIO address range, or so that a base address range of the I/O resource will begin to overlap with a protected MMIO address range after modification, or by changing the number of VFs representing a protected PF, and so forth. The trap filter selectively blocks further processing of a configuration space write request by the I/O subsystem of the processing system in that if the trap filter determines that the configuration space write request will not modify the MMIO address decoding of a protected I/O resource, the trap handler allows the I/O subsystem to complete the write request, and thus modify or update the configuration space of the target I/O resource. Conversely, if the trap filter determines that the configuration space write request will modify the MMIO address decoding, then the trap handler blocks the write request from being further processed by the I/O subsystem. This may include the trap handler aborting the write request and signaling to the hypervisor that the write request has been aborted or blocking the write request from completing while reporting to the hypervisor and the VM that the requested write was completed (and thus obscuring the block of the write request from the VM and hypervisor).

For ease of illustration, embodiments of the systems and techniques are described in the context of a processing system employing PCI or PCIe for I/O device connection and communication, SR-IOV for I/O virtualization, and SEV for protecting I/O data and communications (referred to herein as SEV-IO). However, these systems and techniques are not limited to these implementations. Thus, reference herein to PCI/PCIe, SR-IOV, or SEV-IO applies equally to any of a variety of MMIO-based I/O device connection schemes, any of a variety of I/O virtualization schemes, and any of a variety of per-VM MMIO encryption/protection schemes, respectively, unless otherwise noted.

FIG. 1 illustrates a processing system 100 employing secured I/O resource protection in accordance with at least one embodiment. The processing system 100 may be implemented in any of a variety of electronic devices, such as a laptop, tablet, or desktop computer, a server, a gaming console, a compute-enabled cellular phone, a compute-enabled watch or other wearable device, a compute-enabled television, a head-mounted display device, and the like. The processing system 100 includes a basic input output system (BIOS) 102, one or more core complexes 104 (such as the two illustrated core complexes 104-1, 104-2), a secure processor 106, a system management unit (SMU) 108, a system management interrupt (SMI) component 110, a memory controller 112 (and coherent slave), an I/O subsystem 114, and at least one system memory 116. These components are interconnected via one or more interconnects 118, such as one or more HyperTransport interconnects, Infinity Fabric interconnects, and the like.

The BIOS 102 stores basic configuration information for the processing system 100 and operates to initialize the processing system 100 as well known in the art. The core complexes 104-1, 104-2 each includes one or more processor cores and associated support components, which execute executable instructions stored in the form of one or more software programs accessed from the system memory 116. The processor cores of the core complexes 104 can include central processing unit (CPU) cores, graphics processing unit (GPU) cores, and the like. The secure processor 106 (also frequently referred to a platform security processor or PSP) includes a microcontroller or other processor responsible for creating, monitoring and maintaining the security environment of the processing system 100, including managing the boot process, initializing various security related mechanisms, and monitoring the system 100 for any suspicious activity or events and implementing an appropriate response. The SMU 108 is a microcontroller or other processor core responsible for power savings functionality and system configuration tasks alongside the BIOS and secure processor 106. The SMI component 110 executes firmware to process system interrupts, including system interrupts triggered by the SMU 108. Although illustrated as a separate component, in other embodiments the SMI component 110 is implemented as part of the BIOS 102. The memory controller 112 manages caching and memory access operations for accesses to the system memory 116 on behalf of other components of the system 100. The operations of these components with regard to secure I/O protection techniques are described in greater detail herein.

The I/O subsystem 114 includes an I/O hub 120 and a plurality of I/O devices interconnected via one or more I/O buses. In the illustrated embodiment, the plurality of I/O devices includes a plurality of PCIe devices interconnected via a plurality of PCIe busses, including a PCIe root complex 122 (also commonly referred to as the "host bridge" or "host"), a switch 124, and a plurality of endpoint devices 126, 128, 130. The I/O devices further can include, for example, one or more PCIe-to-PCI bridges. The endpoint devices 126, 128, 130 may include any of a variety of peripheral devices or computational accelerators, such as a network interface card (NIC), a mass storage device, a discrete graphics processing unit (GPU), and the like. The I/O hub 120 operates as the interface between the I/O resources, the system memory 116, and the other components of the processing system 100, and thus includes an input/output memory management unit (IOMMU) 132 that serves as the direct interface between the I/O resources and the system memory 116, and thus performs direct memory access (DMA) operations on behalf of the I/O resources, as well as implements various memory protection techniques to prevent malicious access to MMIO address spaces. In one embodiment, the IOMMU 132 includes a SEV-IO component 134 having an encryption engine (e.g., an Advanced Encryption System (AES) engine) and access to an encryption key store (not shown) in support of SEV-IO functionality, as described below.

In at least one embodiment, the processing system 100 implements a virtualized environment in which physical resources of the processing system 100 support a plurality of virtual machines (VMs) 136, such as the illustrated VMs 136-1 and 136-2, each being an emulation of at least a portion of the processing system 100. Each VM 136 implements a separate guest operating system (OS) kernel 138 and one or more guest software applications 140 supported by the guest OS kernel 138 of the corresponding VM 136. A hypervisor 142 (also commonly referred to as a "virtual machine monitor") is executed at the processing system 100 and operates to instantiate, monitor, and manage the VMs 136 and the resources of the processing system 100 utilized by the VMs. Such operations can include, for example, assigning virtual representations of physical resources, or the physical resources themselves, to the VMs 136, managing obfuscation of physical resources, mitigating access conflicts, and otherwise acting to prevent a VM 136 from accessing data or resources of the other VMs 136 in the processing system 100.

To facilitate efficient virtualization and to secure access to the allocated resources of a VM 136 for only that VM, in at least one embodiment the processing system 100 employs two systems: SR-IOV or another I/O virtualization technique; and SEV-IO or another VM-based MMIO encryption process. In PCIe, each I/O device presents itself to the I/O subsystem 114, and the overall processing system 100 itself, as one or more physical functions, where each physical function represents an independent functionality of the I/O device in that each physical function is capable of operating as a target for a bus transaction, as well as capable of operating as an initiator of a bus transaction. An I/O device may include multiple physical functions as a reflection of a number of separate or disparate functionality provided by the I/O device. In the SR-IOV protocol (and other IOV protocols), an SR-IOV enabled I/O device may present a physical function (PF) as one or more virtual functions (VF), where each VF may be separately assigned to a corresponding VM 136 and behaves in the same manner as the physical function from the perspective of the VM 136; that is, a VF is assigned to a particular VM 136 and operates from the perspective of the VM 136 as though it were the PF. In this manner, a single PF of an I/O resource can be shared among multiple VMs in a manner that reduces or eliminates interference or conflict amongst the VMs. To illustrate, assume endpoint device 126 is a peripheral device that has both a network interface card (NIC) and a mass storage device. The functionality of the NIC is made available as a PF 144, which is virtualized as a VF 146, which is assigned to the VM 136-1. The functionality of the mass storage device is made available as a PF 148, which is virtualized as two VFs 150, 152, with VF 150 being assigned to VM 136-1 and VF 152 being assigned to VM 136-2. For the SEV-IO or other VM-based MMIO encryption technique, the one or more MMIO address spaces assigned to, or otherwise associated with a VM and identified as an protected MMIO address space is encrypted and decrypted by the SEV-IO component 134 using a VM-specific encryption key so that data and other information is protected from cleartext access by an unauthorized VM. Each presented function of an I/O device, whether a PF or a VF, thus acts as an "I/O resource" of the processing system 100.

In PCI, PCIe, and similar protocols, each PF or VF is represented to the software of the processing system 100 by a set of registers that are mapped to a configuration address space in the system address map, these set of registers to store information uniquely identifying the resource, information representing the capabilities of the corresponding function, and information representing the resource needs of the function, as well as the MMIO address space(s) and other system resources allocated to the function. In PCI, this set of MMIO-addressed registers generally is referred to as a "configuration space" of the corresponding function or device. PCIe has a larger and more detailed configuration space, referred to as an "extended configuration space." For ease of reference, the term "configuration space" applies to a PCI-type non-extended configuration space or a PCI extended configuration space, unless otherwise noted. Further, PFs and VFs each have their own configuration spaces, such as a configuration space 154 for PF 144 and a configuration space 156 for VF 146. As such, the term "configuration space" refers to the configuration space for a PF or a VF, unless referring specifically to a configuration space for a VF, in which case is referenced as a "virtual configuration space."

For PCI and PCIe, the basic format of a configuration space of an I/O resource typically includes a configuration header, one or more base address registers (BARs), and some additional control fields. The format and fields of the configuration header typically depends on the type (device or bridge) of the corresponding I/O resource, but generally include fields for storing a device identifier (e.g., a bus-device-function (BDF) identifier), a vendor identifier, a header type, and the like. Each BAR, after enumeration, identifies the base address of a corresponding MMIO address range assigned to the I/O resource. For PCIe, the configuration space further may include one or more extended capability structures, such as a resizable BAR extended capability structure that allows the I/O resource to present multiple size options, an SR-IOV extended capability structure that facilitates management of the VFs associate with a PF, and the like.

Conventionally, a hypervisor has control of the configuration spaces of the I/O resources of an I/O subsystem in order to facilitate resource allocation, such as MMIO address allocation at initial configuration, programming the BDF of the various PFs and VFs, assigning or removing a device to or from a VM, and the like. However, as the MMIO protection afforded by SEV-IO and similar techniques is based on protection of specific MMIO address spaces based on specific encryption keys and as the configuration spaces of the I/O resources reflect, in part, the MMIO address mapping or decoding for the I/O resource, a hypervisor's ability to modify the MMIO address decoding or mapping for the I/O resource via modification of the configuration space for the I/O resource may allow a malicious or faulty hypervisor to bypass the protections afforded by SEV-IO by either changing the MMIO address decoding for an I/O resource so that MMIO operations involving the I/O resource fall outside of a protected MMIO address range and thus are not encrypted, and thus allowing the hypervisor or a guest VM cleartext access to protected data of another guest VM.

To reduce or eliminate the risk of unauthorized access to MMIO of an SEV-IO-enabled or otherwise encryption-protected I/O resource, in at least one embodiment the processing system 100 employs secure I/O protection in the form of a process for trapping write requests by the hypervisor 142 (or other component) that target the configuration space of an SEV-IO-enabled/protected I/O resource. Such write requests are referred to herein as "configuration space write requests." In at least one embodiment, a trap handler 158 implemented in firmware, software or hard-coded logic, or a combination thereof, in a management component, such as one or both of the SMU 108 or SMI component 110, traps a configuration space write request and analyzes the target and effect of the write to the configuration space that the write request is seeking. If the trap handler 158 determines that the write, if completed, would result a change to the address decoding of an SEV-IO or other encryption-protected I/O resource, the trap handler 158 prevents further processing of the write request by the I/O subsystem 114, such as, for example, by either aborting the requested write, or blocking the write from completing, but reporting completion of the write to the hypervisor 142 so that the hypervisor 142 remains unaware that the write was not in fact performed. Details for this configuration space write trap process is described below with reference to FIGS. 2-6.

The operation of the trap handler 158 in some embodiments is handled by a single management component, such as the SMU 108, and in other embodiments is spread over multiple management components. For example, in some embodiments, the trap handler 158 is implemented entirely at the SMU 108, so that the SMU 108 traps all configuration space write requests and selectively blocks a trapped write request. In other embodiments, a portion of the trap handler 108 is implemented at the SMU 108 so as to trap all configuration space write requests and then write the pertinent details of the configuration space write request to a memory location accessible by a SMI handler of the SMI component 110, after which the SMU 108 writes to a command port of the SMI component 110 to trigger an SMI, and then completes the configuration space write cycle without actually writing to the target. The SMI handler, acting as another component of the trap handler 158, then performs the trap filtering process described herein, and if the SMI handler determines the trapped write request is an authorized write, completes the write cycle by actually writing to the target as requested.

Figure 2:
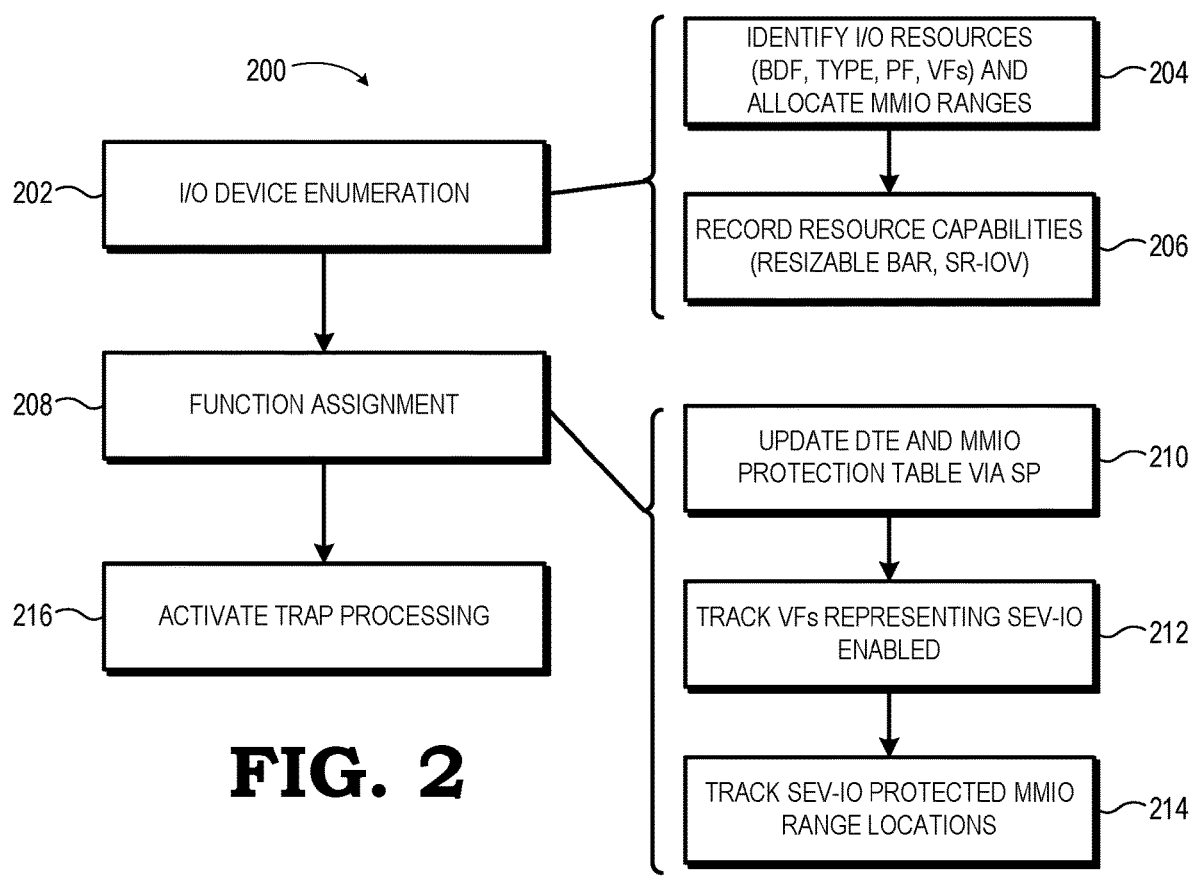
FIG. 2 is a flow diagram illustrating a method for initial configuration of an I/O subsystem in accordance with some embodiments.

FIG. 2 illustrates an example method 200 for initial configuration of the I/O subsystem 114 of the processing system 100 in accordance with some embodiments. The method 200 initiates with PCIe enumeration at block 202 in response to a boot or power-on reset (POR) process or following a hot swap of an I/O resource (in which case the process would be PCIe re-enumeration). During the PCIe enumeration process, the BIOS 102 traverses the hierarchy of resources represented in the I/O subsystem 114, starting with the root complex 122, and enumerating each discovered bus, device, and function (virtual or physical) as represented by subblock 204. As part of this enumeration process, each identified I/O resource is assigned a bus-device-function (BDF) identifier, which typically is composed as three hexadecimal numbers separated by colons, such that the BDF identifier 01:02:00 identifies the first function of the second device encountered on the second bus encountered during the enumeration process. The BDF identifier is also commonly referred to as the Device ID, or DID. In addition to enumerating each I/O resource, the BIOS 102 further identifies various other characteristics of each I/O resource encountered, such as the type of I/O resource (e.g., Type 0 (device-type) or Type 1 (bridge-type)), as well as whether a function being evaluated is a PF or a VF. Further, during this process, the BIOS 102 or other component of the processing system 100 allocates an MMIO address space(s) to each discovered I/O resource based on the BARs and other address-based information contained in the configuration space of that I/O resource. While the BARs of the configuration space of an I/O resource are at a known and fixed location, PCIe introduced two additional address-related parameters that may be at variable locations: a resizable BAR extended capability structure; and an SR-IOV extended capability structure. Accordingly, at subblock 206, the SMU 108 traverses the I/O resource hierarchy discovered by the BIOS 102 so as to determine and whether each encountered I/O resource has a resizable BAR or whether the I/O resource has an SR-IOV capability or other I/O virtualization capability, and if so, notes and records the locations of the corresponding extended capability structures for subsequent reference.

To facilitate storage and ease of access to the I/O resource information identified during the enumeration process of block 202 and to facilitate the SMU 108 to rapidly identify where all of the MMIO decoders are located, in at least one embodiment the SMU 108 maintains at least one resource tracking table 160 (FIG. 1) in the system memory 116 or other memory of the processing system 100. The resource tracking table 160 includes a table or other data structure that correlates each enumerated BDF identifier with its corresponding characteristics determined during the enumeration process of block 202. Table 1 illustrates an example partial configuration for the resource tracking table 160:

TABLE 1

| BDF | Type | PF/VF | Related PF | Resizable BAR | SR-IOV |
|---|---|---|---|---|---|
| 00:00:00 | 1 | PF | | — | — |
| 01:00:00 | 0 | PF | | x0008 | x0012 |
| 01:00:01 | 0 | VF | 01:00:00 | x0010 | x0104 |
| 01:00:02 | 0 | VF | 01:00:00 | x0010 | x0104 |

In the example represented by Table 1, each entry of the resource tracking table 160 is indexed by the BDF identifier/DID of the corresponding I/O resource and includes a field to identify the type of resource, a field to identify whether the resource is a PF or a VF, a field to identify the corresponding PF (e.g., by the PF's BDF identifier) if the I/O resource is a VF, a field to identify the location of the resizable BAR extended capability structure if an I/O resource has such capability (e.g., as a hexadecimal offset into the configuration space), and a field to identify the location of the SR-IOV extended capability structure in the configuration space (e.g., as a hexadecimal offset into the configuration space) if the I/O resource has such capability. It should be noted that while omitted from Table 1 for ease of illustration, the resource tracking table 160 typically would also store a representation of the tree structure on the primary, secondary, and subordinary bus structure, and which would be updated whenever there is a hot plug being added or removed.

During the boot up process following I/O resource enumeration, or following re-enumeration as a result of hot swapping of an IO device, the hypervisor 142 is initiated and one or more VMs 136 are instantiated. Accordingly, at block 208 the processing system 100 assigns IO functions to the various instantiated VMs 136 using any of a variety of I/O resource assignment algorithms in accordance with SR-IOV or other I/O virtualization techniques. In at least one embodiment, the IOMMU 132 maintains a device table 162 (FIG. 1) that contains a plurality of device table entries (DTEs), each valid DTE including a field storing the BDF identifier of an enumerated I/O resource and a field containing a pointer to the one or more guest page tables in system memory 116 for the associated I/O resource, a field containing a pointer to the one or more host page tables in system memory 116, as well as other fields containing interrupt information, mode and control bits. Accordingly, when an I/O resource is assigned to a VM 136 (or the hypervisor 142 itself), at subblock 210 the hypervisor 142 programs or updates, via the secure processor 106, the DTE of the device table 162 and the entry of the MMIO protection table 166 associated with the assigned I/O resource to reflect the assignment, including the guest page table pointer, guest-related attributes in the DTE, an indicator of whether the device is SEV-IO-enabled and if, so, its VMTag assignments, the MMIO region the guest can access, and the like.

During the function assignment process, the processing system 100 determines whether the function being assigned is to be SEV-IO enabled; that is, the MMIO address range(s) of the function are to be protected via an encryption scheme. If so, further at subblock 210 the hypervisor 142, via the secure processor 106, programs or updates an MMIO protection table 166 (FIG. 1) maintained in system memory 116 so as to identify the MMIO address range(s) of the SEV-IO-enabled I/O resource as a protected MMIO address range. Typically, the MMIO protection table 166 includes an entry for each protected MMIO address range, with a field containing a base address of the protected MMIO address range or other address range identifier used as an index for the entry, and one or more fields containing identifiers of the VMs 136 that are authorized to access the corresponding MMIO address range.

As noted above and as described in greater detail herein, the SMU 108 traps and filters a write request to the configuration space of a protected I/O resource that attempts to modify those parameters of the configuration space that specify or control the MMIO address decoders of the protected I/O resource. Accordingly, the SEV-IO assignment process 208 further includes the SMU 108 recording and updating a list of functions that are SEV-IO-enabled (that is, are protected) at subblock 212, and recording and updating a list of SEV-IO-protected MMIO address range locations at subblock 214. To this end, the SMU 108 maintains a protected function table 168 (FIG. 1) that reflects the current list of protected functions and a protected MMIO address range location table 170 (FIG. 1) that reflects the current list of protected MMIO address range locations. The protected function table 168 is implemented as, for example, a list of protected functions identified by their BDF identifiers/DIDs, or as a table with an entry for each enumerated function in the I/O subsystem 114, the entry including a field identifying whether the corresponding function is SEV-IO-enabled/protected.

After I/O resource enumeration (block 202) and once the first I/O resource is assigned as a protected resource to a VM 136 (or to the hypervisor 142) during function assignment (block 208), the SMU 108 activates configuration space write trap processing at block 216, which is described in greater detail below with reference to FIGS. 3-6.

Figure 3:
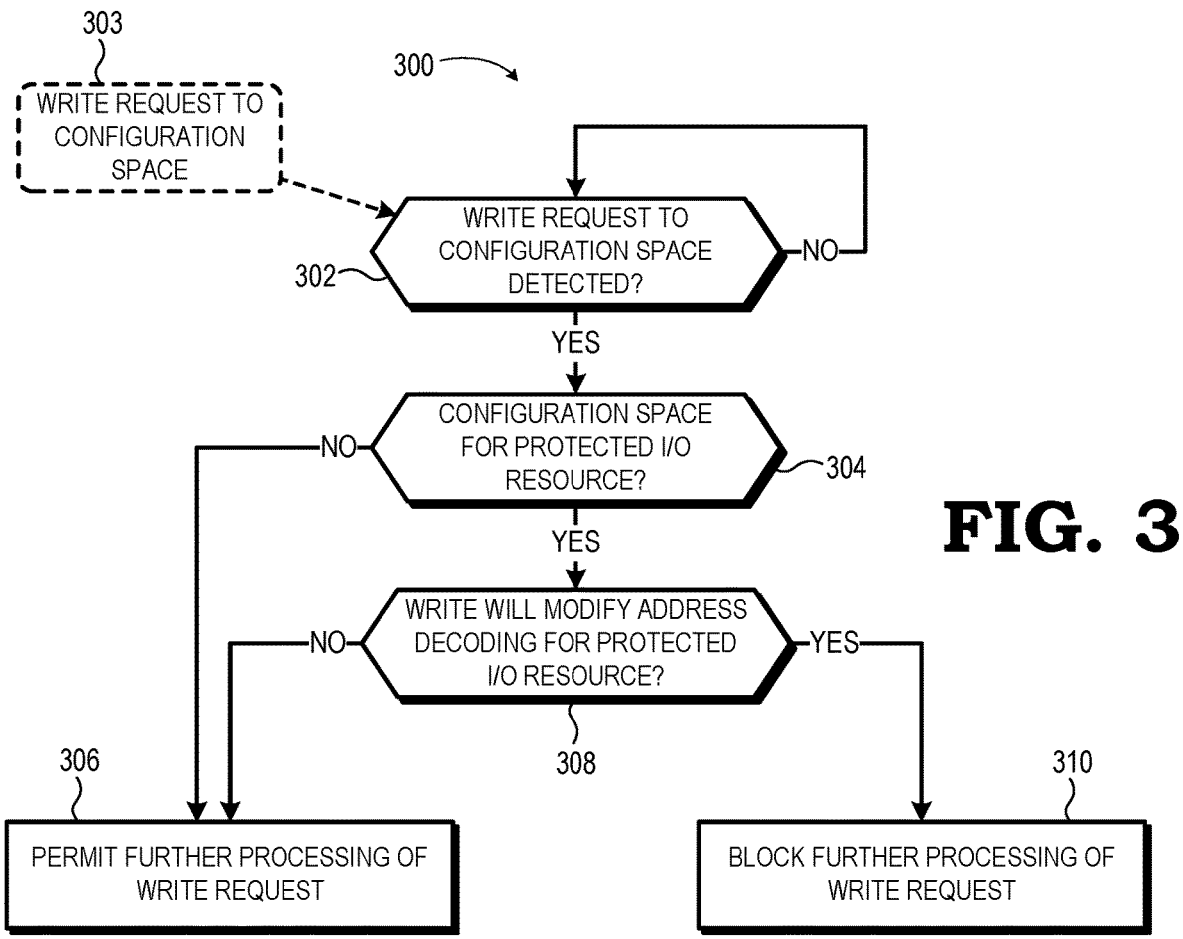
FIG. 3 is a flow diagram illustrating a method for configuration space write request trapping in accordance with some embodiments.

FIG. 3 illustrates a method 300 for configuration space write trap processing in accordance with at least some embodiments. Following the SMU 108 activating configuration space write trap processing at block 216 (FIG. 2), at block 302 the I/O hub 120 monitors the interconnect 118 for issuance by the hypervisor 142 of a write request directed to the configuration space of an I/O resource (that is, a "configuration space write request"). In response to detecting a configuration space write request 303, at block 304 the I/O hub 120 determines whether the targeted function is SEV-IO-enabled or otherwise protected. If the targeted function is not protected, then at block 306 the SMU 108 permits further processing of the configuration space write request 303 by the I/O subsystem 114, including completion of the write represented by the configuration space write request 303 if all other write request validity criteria are met. Otherwise, if the configuration space write request 303 is directed to the configuration space of a protected function, at block 308 the SMU 108 invokes the trap handler 158 to determine whether the write operation intended by the configuration space write request 303 will modify the address decoding for the protected function. If the trap handler 158 determines that the requested write will not affect address decoding, then the SMU 108 permits further processing of the configuration space write request 303 by the I/O subsystem 114 at block 306. Otherwise, if address decoding will be affected, then at block 310 the SMU 108 blocks the write request from further processing by the I/O subsystem 114. This can include, for example, aborting the configuration space write request 303 and sending an abort indicator back to requesting VM 136, or signaling completion of the requested write to the requesting VM 136 without actually performing the requested write, and thus effectively hiding the fact that the write request was blocked from the requesting VM 136.

Figure 4:
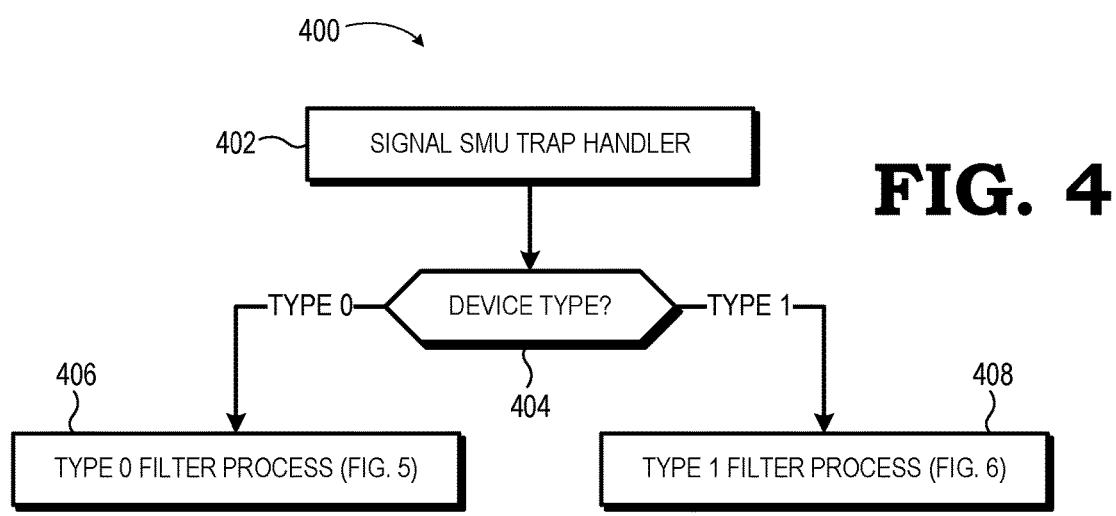
FIG. 4 is a flow diagram illustrating a method for determining which trap filter to employ for a trapped configuration space write request in accordance with some embodiments.

FIGS. 4-6 illustrate example embodiments of the configuration space write trap and filter process employed by the trap handler 158 at block 308 of method 300 of FIG. 3. The particular filtering algorithm employed by the trap handler 158 depends on whether the targeted function is an endpoint device (Type 0) or a bus device (Type 1).

Thus, as illustrated by the filter selection method 400 of FIG. 4, in response to the trap handler 158 being signaled in response to detecting a configuration space write request directed to a protected resource (block 402), the trap handler 158 determines the resource type of the targeted resource at block 404. In one embodiment, the trap handler 158 makes this determination based on the type information stored in the entry of the resource tracking table 160 corresponding to the targeted resource. In another embodiment, the trap handler 158 accesses the Header Type field (located at offset 0Eh) in the configuration space of the targeted resource and determines the resource type based on whether this field stores a 00h (Type 0) or a 01h (Type 1).

In the event that the targeted resource is a Type 0 device, the trap handler 158 utilizes a Type 0 filter process for the trapped configuration space write request at block 406, which is described below with reference to FIG. 5. Otherwise, in the event that the targeted resource is a Type 1 device, the trap handler utilizes a Type 1 filter process for the trapped configuration space write request at block 408, which is described below with reference to FIG. 6.

FIG. 5 illustrates an example implementation of the Type 0 filter process 406 employed by the trap handler 158 for a trapped configuration space write request in accordance with some embodiments. As explained above, the trap handler 158 operates to detect and block configuration space write requests that would modify an MMIO address decoding for a protected I/O resource. While FIG. 5 illustrates a number of evaluations that may be performed to detect such write requests, the Type 0 filter process 406 is not limited to only these example evaluations. Moreover, while a particular order or sequence of filtering evaluations is illustrated for ease of discussion, these filtering evaluations may be performed in a different order, one or more filtering evaluations may be omitted, or one or more other filtering evaluations may be included in accordance with the teachings and guidelines provided herein.

One parameter affecting an MMIO address decoder for an I/O function is the one or more BARs of the configuration space for the I/O function, with each valid BAR specifying the base address of a corresponding MMIO address range. Modification of a valid BAR thus changes the location of the corresponding MMIO address range. Some I/O devices may employ an expansion read-only memory (ROM), and any such expansion ROM has its own BAR in the configuration space. Accordingly, modification of the base address stored in the expansion ROM BAR would affect the address translation for read/write operations into the expansion ROM of the device. In view of these considerations, at block 502 the trap handler 158 determines whether the configuration space write request targets a BAR (e.g., at offset 0x10h, 0x14h, 0x18h, 0x1Ch, 0x20h, or 0x24h or expansion ROM BAR (e.g., at offset 0x30h) of the configuration header of the configuration space of the protected I/O resource. If so, at block 504 the trap handler 158 reads the targeted BAR to determine the base address range represented by the targeted BAR, and then determines whether the base address range overlaps any of the protected MMIO address ranges represented in the protected MMIO address range location table 170 or, alternatively, in the MMIO protection table 166. If there is overlap, then at block 506 the trap handler 158 identifies the configuration space write request as an unauthorized write request, in response to which the configuration space write request is blocked from further processing by the I/O subsystem 114, as described above with reference to block 310 of method 300.

Otherwise, at block 508 the trap handler 158 determines whether the write operation represented by the configuration space write request, if completed, would result in the base address range represented by the modified BAR overlapping any of the protected MMIO address ranges represented in the protected MMIO address range location table 170, or alternatively, in the MMIO protection table 166. If so, then the trap handler 158 identifies the configuration space write request as an unauthorized write request at block 506, which is then blocked from further processing by the SMU 108.

Other parameters affecting an MMIO address decoder for an I/O function is the number of virtual functions instantiated for a given physical function or the system page size for a targeted VF. However, in addition to representing the number of VFs, the value of NumVF can affect the values in First VF Offset and VF Stride of the corresponding PF, and thus represent a security risk. Likewise, the system page size defines the page size of the VF memory addresses, and when changed, renders the contents of all corresponding VB BAR registers indeterminate, and thus also poses a security risk. Accordingly, at block 510 the trap handler 158 determines whether the configuration space write request is targeting a PF, and if so, whether at least one VF of the PF is identified as a SEV-IO-enabled device or otherwise identified as protected via either or both of the tables 170, 166, and if so, whether the configuration space write request is attempting to change the number of virtual functions by changing the value in the NumVF field (at offset 0x10h) of the SR-IOV Extended Capability structure of the targeted configuration space or is attempting to change the system page size by changing the value in the System Page Size field (at offset 0x20h) of the SR-IOV Extended Capability structure. If so, then the trap handler 158 identifies the configuration space write request as an unauthorized write request at block 506, in response to which the configuration space write request is blocked from further processing by the SMU 108.

As another evaluation, at block 512 the trap handler 158 determines whether the configuration space write request is targeting a VF BAR in the SR-IOV Capability structure (e.g., at any of offsets 0x24h, 0x28h, 0x2Ch, 0x30h, 0x34h, 0x38h) of the configuration space of the targeted protected I/O resource. If so, at block 514 the trap handler 158 reads the targeted VF BAR and the NumVF field (at offset 0x10h) and determines whether any of the VF base address range overlaps any of the protected MMIO address ranges determined from one or both of tables 166, 170. If so, then at block 506 the trap handler 158 identifies the configuration space write request as an unauthorized write request, which is then blocked by the SMU 108 as described above. If not, then at block 516 the trap handler 158 determines whether the write operation represented by the configuration space write request, if completed, would result in the base address range represented by the modified VF BAR overlapping any of the protected MMIO address ranges represented in either or both of the tables 166, 170. If so, then the trap handler 158 identifies the configuration space write request as an unauthorized write request at block 506, which is then blocked from further processing by the SMU 108 as described above.

Another evaluation performed by the trap handler 158 is a determination at block 518 of whether the configuration space request is targeting the BAR Size field (at offset n*8+8, for n=0, 1, 2, 3, 4, or 5) in the Resizable BAR Extended Capability structure of the configuration space or is targeting the VF BAR Size field (at offset n*8+8, n=0, 1, 2, 3, 4, or 5) in the VF Resizable BAR Extended Capability structure of the configuration space. If so, at block 520 the trap handler 158 calculates the offset of the corresponding BAR, and if the resulting base address range or VF base address range would overlap with any of the protected MMIO address ranges represented in either or both of tables 166, 170, the trap handler 158 identifies the configuration space write request as an unauthorized write request at block 506, which is then blocked from further processing by the SMU 108 as described above.

In the event that each of the above-described filter evaluations produces a positive result (that is, does not signify that the configuration space write request is attempting to modify a corresponding aspect of an MMIO address decoder), then at block 522 the trap handler 158 completes the filter process by identifying the configuration space write request as an authorized write request, in response to which the SMU 108 permits the configuration space write request to proceed for further processing, as described above.

FIG. 6 illustrates an example implementation of the Type 1 filter process 408 employed by the trap handler 158 for a trapped configuration space write request in accordance with some embodiments. As explained above, the trap handler 158 operates to detect and block configuration space write requests that would modify an MMIO address decoding for a protected I/O resource. Thus, while FIG. 6 illustrates a number of evaluations that may be performed to detect such write requests, the Type 1 filter process 408 is not limited to only these example evaluations. Moreover, while a particular order or sequence of filtering evaluations is illustrated for ease of discussion, these filtering evaluations may be performed in a different order, one or more filtering evaluations may be omitted, or one or more other filtering evaluations may be included in accordance with the teachings and guidelines provided herein.

An initial evaluation performed at block 602 by the trap handler 158 when the targeted I/O resource is identified as a Type 1 device (that is, a bridge), is whether the targeted I/O bridge has an SEV-IO-enabled/protected device below it in the hierarchy of the I/O subsystem 114. If not, then the configuration space write request is not at risk of attempting to change the MMIO address decoding for a protected I/O resource, and thus at block 604 the trap handler 158 identifies the configuration space write request as an authorized write, and thus the SMU 108 permits the configuration space write request to continue further processing, as described above. Otherwise, at block 606 the trap handler 158 determines whether the configuration space write request might be attempting to change or modify a BDF identifier/DID for spoofing purposes by determining whether the configuration space write request is targeting the Secondary Bus Number field or the Subordinate Bus Number field (both at offset 0x18h) of the Type 1 (Bridge) Configuration Header of the configuration space of the targeted I/O resource. If so, at block 608 the trap handler 158 determines whether the requested write, if performed, would change the bus number for any protected I/O resource. If so, then at block 610 the trap handler 158 identifies the configuration space write request as an unauthorized write which is then blocked from further processing by the SMU 108 as described above.

Another evaluation is performed at block 612, whereby the trap handler 158 determines whether the configuration space write request is targeting a BAR of the bridge configuration header (at offset 0x10h or 0x14h). If so, at block 614 the trap handler 158 determines whether the requested write operation, if completed, would result in a base address range in the modified BAR overlapping any of the protected MMIO address ranges represented in either of tables 166, 170. If so, the trap handler 158 identifies the configuration space write request as an unauthorized write at block 610 so as to block any further processing.

Yet another evaluation is performed at block 616, in which the trap handler 158 determines whether the configuration space write request is targeting the memory base/limit field (at offset 0x20) or the prefetchable memory base/limit (at offset 0x24h, 0x28h, and 0x2Ch) of the bridge configuration header of the configuration space of the targeted I/O resource. If so, at block 618 the trap handler 158 determines whether the requested write operation, if performed, would result in removal of any protected MMIO address ranges that currently are represented in the bridge memory base/limit ranges. If so, the trap handler 158 identifies the configuration space write request as an unauthorized write at block 610 so as to block any further processing. Otherwise, at block 620 the trap handler 158 determines whether the requested write operation, if performed, would result in the addition of a protected MMIO address range that is not already currently represented in the bridge memory base/limit ranges. If so, the trap handler 158 identifies the configuration space write request as an unauthorized write at block 610, in response to which the SMU 108 blocks any further processing of the configuration space write request.

In the event that each of the above-described filter evaluations produces a positive result (that is, does not signify that the configuration space write request is attempting to modify a corresponding aspect of an MMIO address decoder), then at block 604 the trap handler 158 completes the filter process by identifying the configuration space write request as an authorized write request, in response to which the SMU 108 permits the configuration space write request to proceed for further processing, as described above.

In some embodiments, the apparatus and techniques described above are implemented in a system including one or more integrated circuit (IC) devices (also referred to as integrated circuit packages or microchips), such as the processing system 100 described above with reference to FIGS. 1-6. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method for securing memory-mapped input/output (MMIO) in a processing system, the method comprising:
   detecting a write request targeting a configuration space of an input/output (I/O) resource of the processing system; and
   responsive to determining the I/O resource is a protected I/O resource, selectively blocking the write request from further processing based on whether the write request would change an MMIO address decoding of the I/O resource.

2. The method of claim 1, wherein selectively blocking the write request from further processing comprises:
   permitting the write request to continue processing at the processing system responsive to determining the write request would not change an MMIO address decoding of the I/O resource; and
   blocking the write request from further processing at the processing system responsive to determining the write request would change an MMIO address decoding of the I/O resource.

3. The method of claim 2, wherein blocking the write request from further processing comprises one of: aborting the write request and signaling that the write request has been aborted to the issuer of the write request; and terminating the write request and signaling that the write request has been completed to the issuer of the write request.

4. The method of claim 1, further comprising:
   maintaining, in a memory of the processing system, a data structure that identifies which I/O resources of the processing system are protected I/O resources; and
   wherein determining the I/O resource is a protected I/O resource comprises accessing the data structure based on a device identifier associated with the I/O resource.

5. The method of claim 1, wherein:
the write request targets a base address register (BAR) of the configuration space; and
the method further comprises:
   determining the write request would change an MMIO address decoding of the I/O resource responsive to at least one of:
      determining a base address range represented by the BAR overlaps at least one protected MMIO address range of the processing system; and
      determining completion of a write operation represented by the write request would result in a modified base address range represented by the BAR that overlaps at least one protected MMIO address range.

6. The method of claim 5, wherein:
the processing system includes a virtualized I/O device having a physical function and one or more corresponding virtual functions;
the I/O resource is a virtual function of the one or more corresponding virtual functions; and
the BAR is a virtual function BAR of an extended resource capability structure of the configuration space.

7. The method of claim 1, wherein:
the processing system includes a virtualized I/O device having a physical function and one or more corresponding virtual functions;
the I/O resource is the physical function;
the configuration space includes a virtualization extended capability structure having a first field and a second field, the first field specifying a number of virtual functions representing the physical function and the second field specifying a system page size for the one or more virtual functions; and
the method further comprises:
   determining the write request would change an MMIO address decoding of the I/O resource responsive to determining the write request is targeting either of the first field or the second field.

8. The method of claim 1, wherein:
the configuration space includes a resizable base address register (BAR) extended capability structure having a field indicating a BAR size; and
the method further comprises:
   determining the write request would change an MMIO address decoding of the I/O resource responsive to determining the write request is targeting the field indicating the BAR size.

9. The method of claim 1, wherein:
the configuration space includes a resizable base address register (BAR) capability structure having a field indicating a BAR size; and
the method further comprises:
   determining the write request would change an MMIO address decoding of the I/O resource responsive to determining completion of a write operation represented by the write request would generate a modified BAR size that would result in a base address range that overlaps at least one protected MMIO address range of the processing system.

10. The method of claim 1, wherein:
the I/O resource is a bridge-type resource; and
the method further comprises:
   determining the write request would not change an MMIO address decoding of the IO resource responsive to determining that no I/O resource downstream of the bridge-type resource is a protected IO resource.

11. The method of claim 10, further comprising:
determining the write request would change an MMIO address decoding of the I/O resource responsive to determining that completion of a write operation represented by the write request would result in a change to a bus number assigned to the I/O resource.

12. The method of claim 1, wherein determining the I/O resource is a protected I/O resource comprises determining that the I/O resource has an encrypted MMIO address range.

13. A processing system comprising:
a plurality of input/output (IO) devices representing a plurality of I/O resources, each I/O resource having at least one corresponding memory-mapped input/output (MMIO) address range; and
a trap handler configured to detect a write request targeting a configuration space of an identified I/O resource of the plurality of I/O resources and, responsive to determining the identified I/O resource is a protected I/O resource, selectively block the write request from further processing by the processing system based on whether the write request would change an MMIO address decoding of the identified I/O resource.

14. The processing system of claim 13, wherein the trap handler is configured to selectively block the write request from further processing by:
permitting the write request to continue processing at the processing system responsive to determining the write request would not change an MMIO address decoding of the identified I/O resource; and
blocking the write request from further processing at the processing system responsive to determining the write request would change an MMIO address decoding of the identified I/O resource.

15. The processing system of claim 14, further comprising:
a memory configured to store a data structure that identifies which I/O resources of the processing system are protected I/O resources; and
wherein the trap handler is configured to determine the identified I/O resource is a protected I/O resource by accessing the data structure based on a device identifier associated with the identified I/O resource.

16. The processing system of claim 13, wherein:
the write request targets a base address register (BAR) of the configuration space; and
the trap handler is configured to:
   determine the write request would change an MMIO address decoding of the I/O resource responsive to at least one of:
      determining a base address range represented by the BAR overlaps at least one protected MMIO address range of the processing system; and
      determining completion of a write operation represented by the write request would result in a modified base address range represented by the BAR that overlaps at least one of the protected MMIO address ranges.

17. The processing system of claim 16, wherein:
the processing system includes a virtualized I/O device having a physical function and one or more corresponding virtual functions;
the I/O resource is a virtual function of the one or more corresponding virtual functions; and the BAR is a virtual function BAR of an extended resource capability structure of the configuration space.

18. The processing system of claim 13, wherein:
an I/O device of the plurality of I/O devices is a virtualized I/O device having a physical function and one or more corresponding virtual functions;
the identified I/O resource is the physical function;
the configuration space includes a virtualization extended capability structure having a first field and a second field, the first field specifying a number of virtual functions representing the physical function and the second field specifying a system page size for the one or more virtual functions; and
the trap handler is configured to determine the write request would change an MMIO address decoding of the I/O resource responsive to determining the write request is targeting either of the first field or the second field.

19. The processing system of claim 13, wherein:
the configuration space includes a resizable base address register (BAR) extended capability structure having a field indicating a BAR size; and
the trap handler is configured to determine the write request would change an MMIO address decoding of the I/O resource responsive to determining the write request is targeting the field indicating the BAR size.

20. The processing system of claim 13, further comprising:
an encryption component to encrypt MMIO address ranges of one or more of the plurality of I/O resources; and
wherein the trap handler is configured to determine the identified I/O resource is a protected I/O resource by determining that the I/O resource has an encrypted MMIO address range.

21. A non-transitory computer readable medium tangibly embodying a set of executable instructions configured to manipulate at least one processor to:
detect a write request targeting a configuration space of an input/output (I/O) resource of a processing system; and
responsive to determining the IO resource is a protected I/O resource, selectively block the write request from further processing based on whether the write request would change an MMIO address decoding of the IO resource.

* * * * *